US012645967B2

(12) United States Patent
Phung et al.

(10) Patent No.: US 12,645,967 B2
(45) Date of Patent: Jun. 2, 2026

(54) BUSES FOR MODULAR QUBIT DEVICES

(71) Applicant: International Business Machines Corporation, Armonk, NY (US)

(72) Inventors: Timothy Phung, Milpitas, CA (US); Muir Kumph, Croton on Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 861 days.

(21) Appl. No.: 17/819,535

(22) Filed: Aug. 12, 2022

(65) Prior Publication Data

US 2023/0359919 A1 Nov. 9, 2023

Related U.S. Application Data

(60) Provisional application No. 63/364,399, filed on May 9, 2022.

(51) Int. Cl.
*G06N 10/40* (2022.01)
(52) U.S. Cl.
CPC .................................... *G06N 10/40* (2022.01)
(58) Field of Classification Search
USPC .......................................................... 716/100
See application file for complete search history.

(56) References Cited

U.S. PATENT DOCUMENTS

| | | | |
|---|---|---|---|
| 9,379,303 B2 | 6/2016 | Gambetta et al. | |
| 9,858,531 B1 | 1/2018 | Monroe et al. | |
| 10,304,005 B2 | 5/2019 | Chow et al. | |
| 2017/0213143 A1 | 7/2017 | Chow et al. | |
| 2021/0342729 A1* | 11/2021 | Scheer ................ | G06F 15/7896 |

OTHER PUBLICATIONS

International Search Report and Written Opinion received for PCT Application Serial No. PCT/EP2023/062253 dated Nov. 3, 2023, 20 pages.
Colangelo et al.,"A Compact and Tunable Forward Coupler Based on High-impedance Superconducting Nanowires", Physical Review Applied, Nov. 23, 2020, 36 pages.
Zhu et al., "Superconducting Nanowire Single-photon Detector with Integrated Impedance-matching Taper", Applied Physics Letters, Jan. 28, 2019, 9 pages.
Cheng et al., "Broadband on-chip Single-photon Spectrometer", Nature Communications, Sep. 10, 2019, 16 pages.
Moskalenko et al., "High Delity Two-qubit Gates on Uxoniums Using a Tunable Coupler", arxiv.org, Mar. 30, 2022, 18 pages.

(Continued)

*Primary Examiner* — Bryce M Aisaka

(74) *Attorney, Agent, or Firm* — Amin, Turocy & Watson, LLP

(57) ABSTRACT

One or more systems, devices and/or methods of use herein relate to modular quantum devices. According to an embodiment, a device can comprise a first module comprising a first qubit coupled to a first transmission line resonator, and a second module comprising a second qubit coupled to a second transmission line resonator, wherein the first module is embodied on a first chip and wherein the second module is embodied on a second chip.

13 Claims, 17 Drawing Sheets
(3 of 17 Drawing Sheet(s) Filed in Color)

(56) References Cited

OTHER PUBLICATIONS

Gold, A. et al. | "Entanglement Across Separate Silicon Dies in a Modular Superconducting Qubit Device". arXiv:2102.13293v2 [quant-ph] Mar. 11, 2021, 9 pages.

Zhou, Ch. et al. | "A modular quantum computer based on a quantum state router". arXiv:2109.06848v2 [quant-ph] Apr. 11, 2022, 21 pages.

Zhong, Y.P. et al. | "Violating Bell's inequality with remotely connected superconducting qubits". Nat. Phys. 15, 741-744 (2019). https://doi.org/10.1038/s41567-019-0507-7, 5 pages.

Reuer, K. et al. | "Realization of a Universal Quantum Gate Set for Itinerant Microwave Photons". arXiv:2106.03481v1 [quant-ph] Jun. 7, 2021, 13 pages.

Zhao, P. et al. | "Tunable coupling of widely separated superconducting qubits: A possible application towards a modular quantum device". arXiv:2201.03184v3 [quant-ph] Apr. 27, 2022, 6 pages.

European Patent Office, Response to the communication pursuant to Rule 161(1) and 162, European patent application 23725690.4, Mar. 25, 2025, 4 pages.

* cited by examiner

150

100

600

601

610

620

1500

1700

BUSES FOR MODULAR QUBIT DEVICES

This application claims priority to U.S. Provisional Patent Application No. 63/364,399, filed on May 9, 2022, and entitled "BUSES FOR MODULAR QUBIT DEVICES," the entirety of which application is hereby incorporated by reference herein.

BACKGROUND

The subject disclosure relates to quantum computing, and more specifically, to buses for modular qubit devices.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, apparatuses, and methods are described that can facilitate operation of modular qubit devices, and more specifically buses for modular qubit devices.

According to an embodiment, a device can comprise a resonator and a qubit coupled to a first portion of the resonator, wherein the resonator comprises a taper configured to provide a first impedance at the first portion of the resonator and a second impedance at a second portion of the resonator, wherein the first impedance is distinct from the second impedance. An advantage of such a device is that the taper of the resonator can reduce reflections from the qubit.

In some embodiments of the above described device, the device can further comprise a second resonator capacitively coupled to a portion of a second resonator. An advantage of such a device is that it enables the qubit to be coupled to a second qubit coupled to the second resonator.

According to another embodiment, a device can comprise a first quantum processor comprising a first set of one or more qubits coupled to a first transmission line resonator, and a second quantum processor comprising a second set of one or more qubits coupled to a second transmission line resonator, wherein the first quantum processor is embodied in a first chip and the second quantum processor is embodied in a second chip, and wherein the first transmission line resonator is coupled to the second transmission line resonator. An advantage of such a device, is that it allows for easier manufacture of the first quantum processor and the second quantum processor, as they are modular.

In some embodiments of the above described device, the first chip can be located on a first substrate and the second chip can be located on a second substrate. An advantage of such a device is that maintenance costs and maintenance time of the device are reduced as the first and separate chips can be replaced or repaired individually.

According to another embodiment, a device can comprise a first module comprising a first qubit coupled to a first transmission line resonator comprising a first flux controlled coupler, and a second module comprising a second qubit coupled to a second transmission line resonator comprising a second flux controlled coupler, wherein the first module is embodied in a first chip and wherein the second module is embodied in a second chip, and wherein the first transmission line resonator is coupled to the second transmission line resonator. An advantage of such a device is that the flux controlled couplers enable adjustment of the coupling between the first qubit and the second qubit.

In some embodiments of the above described device, the first chip can be located on a first substrate and the second chip can be located on a second substrate. An advantage of such a device is that maintenance costs and time of the device are reduced as the first and separate chips can be replaced or repaired individually.

Various other details of various embodiments described herein are presented in the following clauses.

CLAUSE 1: A device comprising: a resonator; and a qubit coupled to a first portion of the resonator, wherein the resonator comprises a taper configured to provide a first impedance at the first portion of the resonator and a second impedance at a second portion of the resonator, wherein the first impedance is distinct from the second impedance. An advantage of such a device is that the taper of the resonator can reduce reflections from the qubit.

CLAUSE 2: The device of any preceding clause specified in the Summary, wherein the qubit is capacitively coupled to the first portion of the resonator.

CLAUSE 3: The device of any preceding clause specified in the Summary, wherein the qubit is inductively coupled to the first portion of the resonator.

CLAUSE 4: The device of any preceding clause specified in the Summary, wherein the first impedance is greater than the second impedance.

CLAUSE 5: The device of any preceding clause specified in the Summary, wherein the first impedance is within a range of 85-150 ohms.

CLAUSE 6: The device of any preceding clause specified in the Summary, wherein the second portion of the resonator is capacitively coupled to a portion of a second resonator.

CLAUSE 7: The device of any preceding clause specified in the Summary, wherein the second portion of the resonator is inductively coupled to a portion of a second resonator.

CLAUSE 8: A device comprising: a first quantum processor comprising a first set of one or more qubits coupled to a first transmission line resonator; and a second quantum processor comprising a second set of one or more qubits coupled to a second transmission line resonator, wherein the first quantum processor is embodied in a first chip and wherein the second quantum processor is embodied in a second chip, and wherein the first transmission line resonator is coupled to the second transmission line resonator. An advantage of such a device, is that it allows for easier manufacture of the first quantum processor and the second quantum processor, as they are modular.

CLAUSE 9: The device of any preceding clause specified in the Summary, wherein the first chip is located on a first substrate and the second chip is located on a second substrate.

CLAUSE 10: The device of any preceding clause specified in the Summary, wherein the first transmission line resonator comprises a taper configured to provide a first impedance at the first quantum processor, and wherein the second transmission line resonator comprises a second taper configured to provide a second impedance at the second quantum processor.

CLAUSE 11: The device of any preceding clause specified in the Summary, wherein the taper is configured to provide a third impedance at a portion of the first transmission line resonator coupled to the second transmission line resonator, and wherein the second taper is configured to provide a fourth impedance at a portion of the second transmission line resonator coupled to the first transmission line resonator.

CLAUSE 12: The device of any preceding clause specified in the Summary, wherein the first quantum processor is capacitively coupled to the first transmission line resonator and wherein the second quantum processor is capacitively coupled to the second transmission line resonator.

CLAUSE 13: The device of any preceding clause specified in the Summary, wherein the first quantum processor is inductively coupled to the first transmission line resonator and wherein the second quantum processor is inductively coupled to the second transmission line resonator.

CLAUSE 14: The device of any preceding clause specified in the Summary, wherein the first transmission line resonator is capacitively coupled to the second transmission line resonator.

CLAUSE 15: The device of any preceding clause specified in the Summary, wherein the first transmission line resonator is inductively coupled to the second transmission line resonator.

CLAUSE 16: A device comprising: a first module comprising a first qubit coupled to a first transmission line resonator comprising a first flux controlled coupler; and a second module comprising a second qubit coupled to a second transmission line resonator comprising a second flux controlled coupler, wherein the first module is embodied in a first chip and wherein the second module is embodied in a second chip, and wherein the first transmission line resonator is coupled to the second transmission line resonator. An advantage of such a device is that the flux controlled couplers enable adjustment of the coupling between the first qubit and the second qubit.

CLAUSE 17: The device of any preceding clause specified in the Summary, wherein the first flux controlled coupler and the second flux controlled coupler enable adjustable coupling between the first qubit and the second qubit.

CLAUSE 18: The device of any preceding clause specified in the Summary, wherein the first transmission line resonator and the second transmission line resonator are capacitively coupled.

CLAUSE 19: The device of any preceding clause specified in the Summary, wherein the first transmission line resonator and the second transmission line resonator are inductively coupled.

CLAUSE 20: The device of any preceding clause specified in the Summary, wherein the first chip is located on a first substrate and the second chip is located on a second substrate.

DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

In one or more embodiments described herein, systems, devices, and/or apparatuses that facilitate fabrication, design, and/or operation of buses for modular qubit devices are described.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

It is challenging to yield quantum processors on a monolithic qubit chip that have desired qubit characteristics (e.g., frequency). A modular architecture composed of modular quantum processors that are interconnected can be desirable for realizing large-scale quantum processor. However, this will require the ability to perform multi-qubit operations between qubits on separate physical chips with high fidelity, which may be separated by various distances (several 10's of mm).

Accordingly, high fidelity multi-qubit devices across separate chips will allow for the realization of scalable quantum processors using smaller modular units with higher yield, and reduced tolerances on frequency control. Such systems may also be field repaired in cases where there are broken or defective modules without having to replace the entire quantum processor system. Accordingly, described herein are various modular qubit devices wherein qubits are connected to transmission line resonators which are either capacitively or inductively coupled to each other. In an embodiment, the qubits and transmission line resonators are on separate physical chips with no galvanic connection between them to enable modularity.

Figure 1B:
FIGS. 1A and 1B illustrates examples of Josephson junctions and DC squid loops in accordance with one or more embodiments described herein.
Figure 1B:
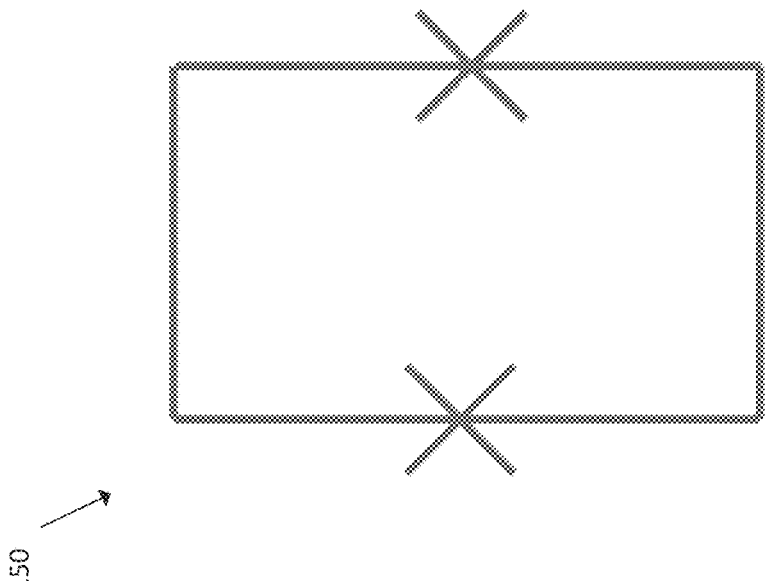
Figure 1A:
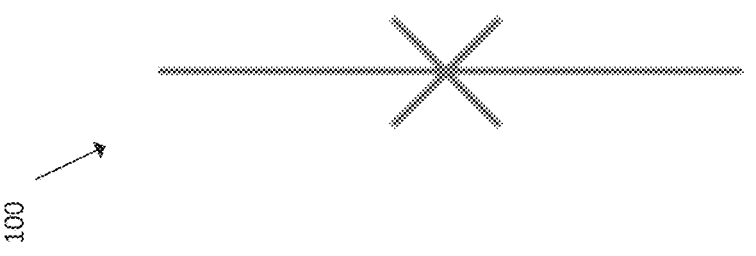

FIG. 1A illustrates an example 100 of how Josephson junctions are illustrated in one or more of the following figures. FIG. 1B illustrates an example 150 of how a DC squid loop is illustrated in one or more of the following figures. It should be appreciated that inductance of a DC squid loop can be adjusted by changing flux through the loop.

Figure 2:
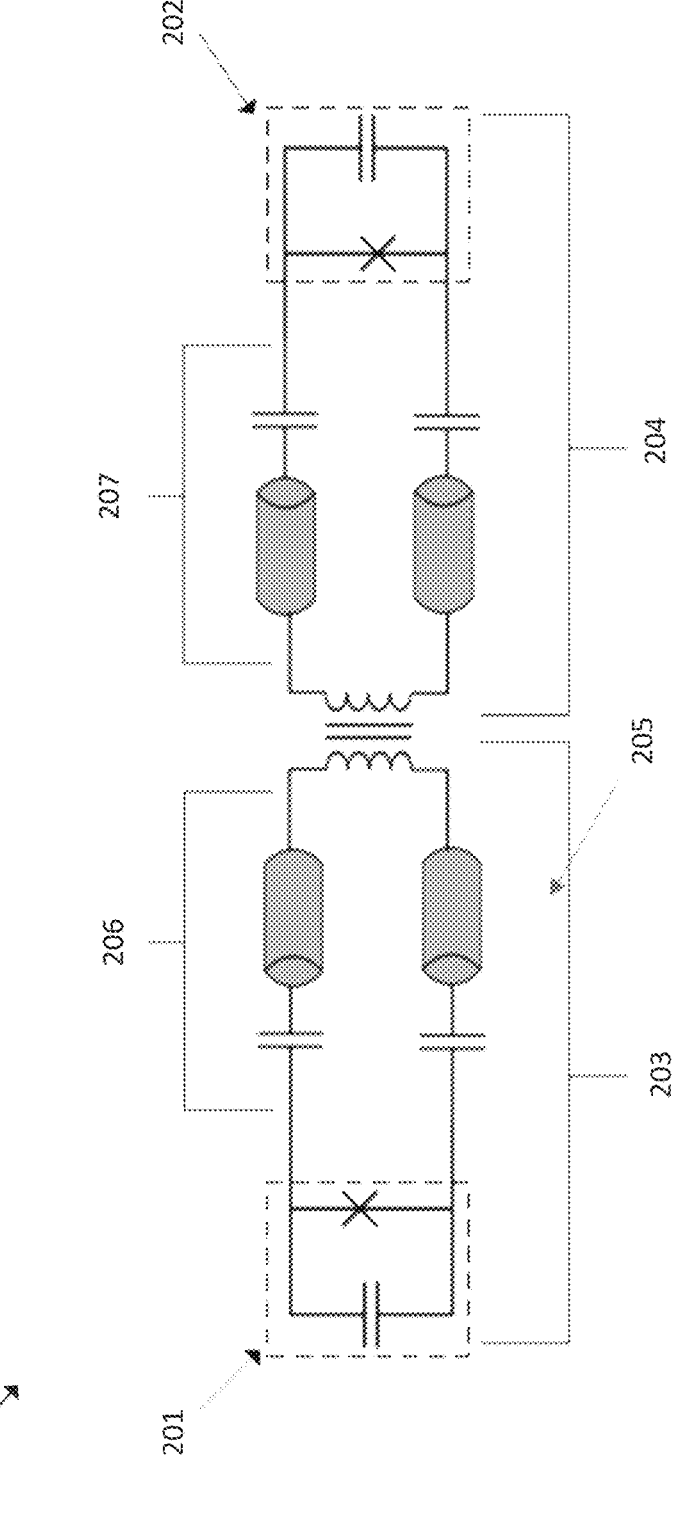
FIG. 2 illustrates an example of a modular quantum device comprising inductively coupled qubits with multimode resonators, in accordance with one or more embodiments described herein.

FIG. 2 illustrates an example of a modular quantum device 200 comprising inductively coupled qubits with multimode resonators, in accordance with one or more embodiments described herein.

Modular quantum device 200 can comprise a first module 203 and a second module 204. For example, first module 203 can comprise a first transmission line resonator 206 formed from a transmission line and other components such capacitors. First module 203 can also comprise a first qubit 201. Similarly, second module 204 can comprise a second transmission line resonator 207 formed from a transmission line and other components such capacitors. Second module 204 can also comprise a second qubit 202. As shown, both the first transmission line resonator 206 and the second transmission line resonator 207 are terminated by inductors, thereby enabling mutual inductance between first module 203 and second module 204 and coupling the first qubit 201 to the second qubit 202. In an embodiment, the first qubit 201 and/or the second qubit 202 can comprise one or more qubits and/or one or more quantum processors.

In an embodiment, the first module 203 can be located on a first chip and the second module 204 can be located on a second chip. In a further embodiment, the first chip and the second chip can be located on separate substrates. By placing the first module 203 and the second module 204 on separate chips and/or separate substrates, modularity can be achieved. For example, rather than producing a quantum computing device on a single chip or substrate, the modular quantum device 200 can be fabricated in separate parts and then assembled together, thereby enabling scalable production and reduced production costs related to decreasing the overall size of the chips and substrates used. Furthermore, modular quantum device 200 can enable modular repair. For example, in existing designs, if a fault occurs with a first qubit, then the entire chip on which the first qubit is located will be replaced, leading to increased repair costs and time. In contrast, if a fault occurs with the first qubit 201 of modular quantum device 200, then the first module 203 can be replaced with a new first module, while the second module 204 is not replaced. Therefore, modular quantum device 200 can enable faster repair and/or decreased repair costs due to modularity. In an embodiment, the geometry of transmission lines in the first transmission line resonator 206 and/or the second transmission line resonator 207 can be tapered (e.g., physically wider at one end and narrower at the other end) in order to achieve different levels of coupling and/or different forms of cross resonance gates. For example, the first transmission line resonator 206 can comprise a taper configured to provide a first impedance at a first portion coupled to the first qubit 201 and a second impedance at a second portion coupled the second transmission line resonator 207. In an embodiment, the first impedance can be in the range of 85-150 ohms and the second impedance can be lower than the first impedance. In another embodiment, the first impedance can be within any range and the second impedance can be less than the first impedance.

Figure 3:
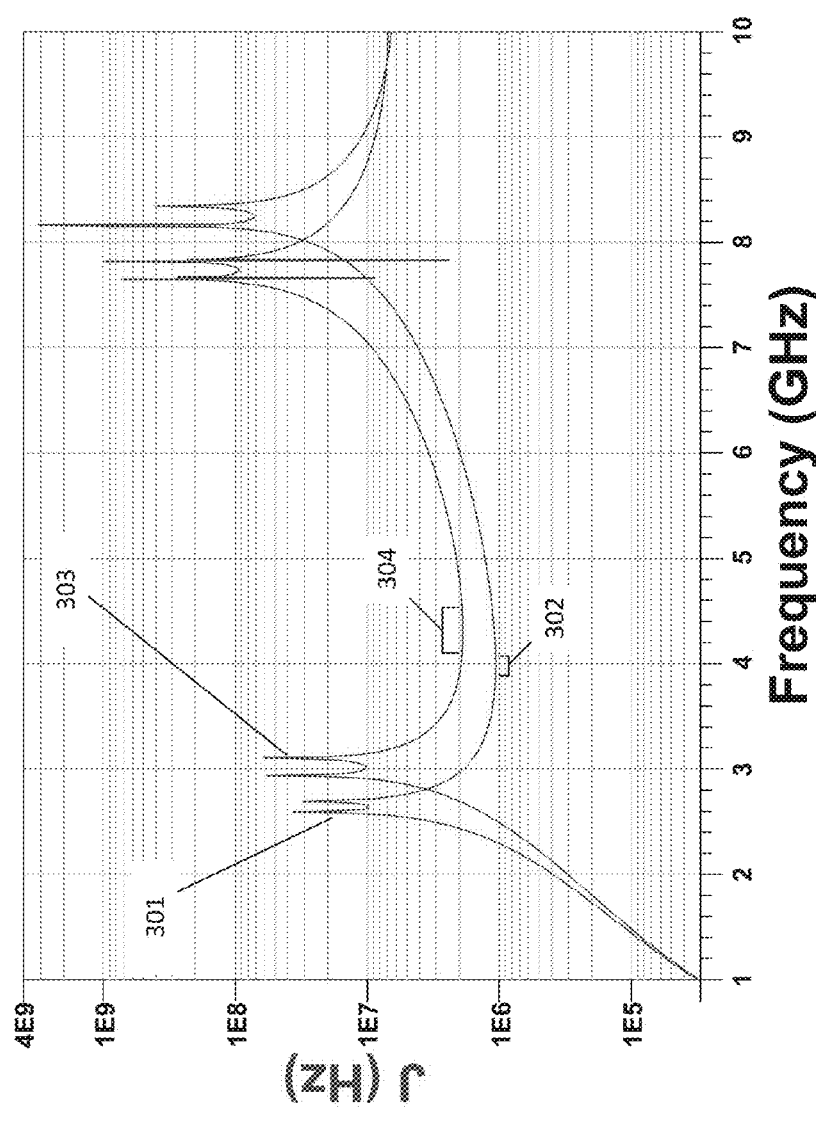
FIG. 3 illustrates a graph showing the impact of changing geometry of a transmission line has on coupling of two qubits, in accordance with one or more embodiments described herein.

FIG. 3 illustrates a graph 300 showing the impact of changing geometry of a transmission line has on coupling of two qubits. The x-axis of graph 300 represents the frequency of qubits measured in GHz. The y-axis of graph 300 represents the strength of coupling between two qubits, referred to as an amount of J, measured in Hz. Line 301 represents the amount of J between qubits at various qubit frequencies. As shown, there exists a quasi-flat region 302 of line 301. At the quasi-flat region 302, qubit frequency can be changed with a relatively small amount of variation in J, enabling operation of the qubits at different frequencies with a relatively small change in coupling. Line 303 represents the amount of J between qubits at various frequencies, wherein the qubits are connected by a tapered transmission line (e.g., the transmission line is physically wider at one end and narrower at the other end). As show, by utilizing a tapered transmission line, the location of a quasi-flat region 304 can be changed, thereby enabling targeting of specific locations of the quasi-flat region based on different taper geometries. Accordingly, different taper geometries can be utilized to produce different quasi-flat regions, enabling specific amounts of J at specific frequencies based on the design of the modular quantum device. It should further be appreciated that some taper geometries can also produce quasi-flat regions of greater length than standard transmission lines, thereby enabling larger changes in qubit frequency with minimal change in coupling. It should also be appreciated that tapered geometries can also produce higher amounts of coupling, as shown by graph 300.

Figure 4:
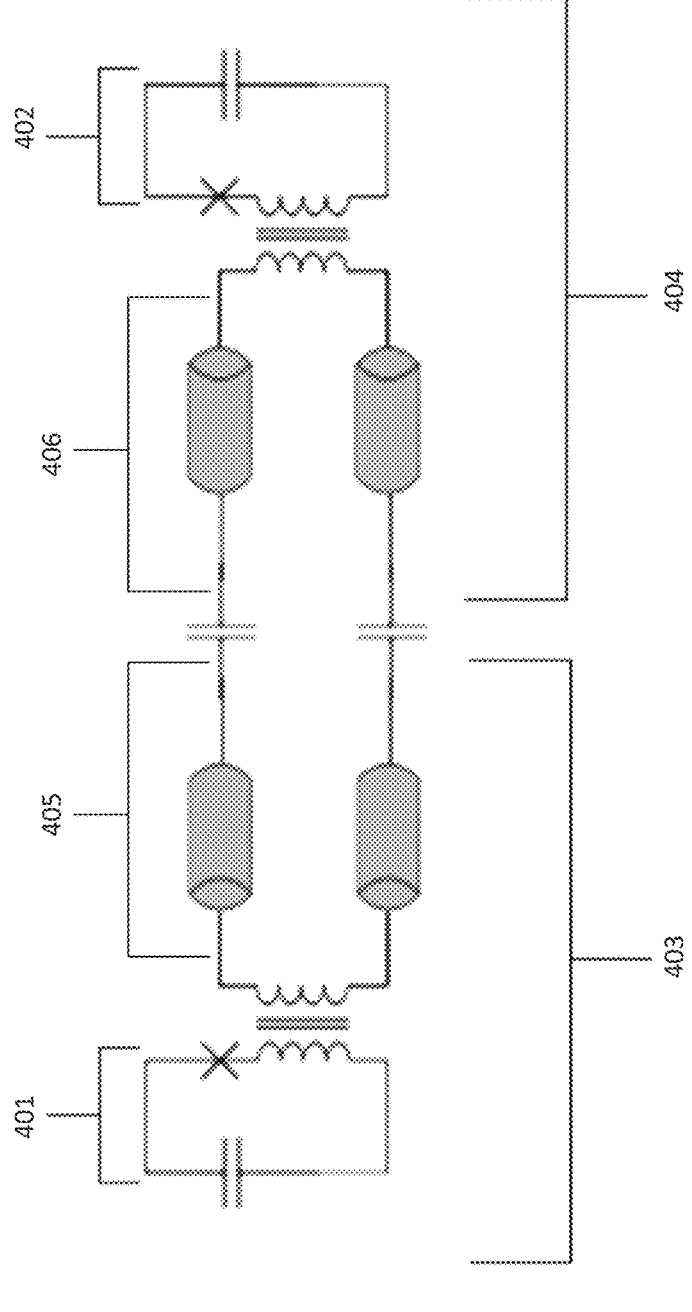
FIG. 4 illustrates an example of a modular quantum device utilizing inductive coupling on the qubit end, in accordance with one or more embodiments described herein.

FIG. 4 illustrates an example of a modular quantum device 400 utilizing inductive coupling on the qubit end. Modular quantum device 400 can comprise a first module 403 and a second module 404. First module 403 can comprise a first qubit 401 inductively coupled to a first transmission line resonator 405. Second module 404 can comprise a second qubit 402 inductively coupled to a second transmission line resonator 406. In an embodiment, the first transmission line resonator 405 and the second transmission line resonator 406 can be capacitively coupled. Similar to modular quantum device 200, described above in FIG. 2, the first module 403 and the second module 404 of modular quantum device 400 can be located on separate chips and/or separate substrates to enable modularity.

Figure 5:
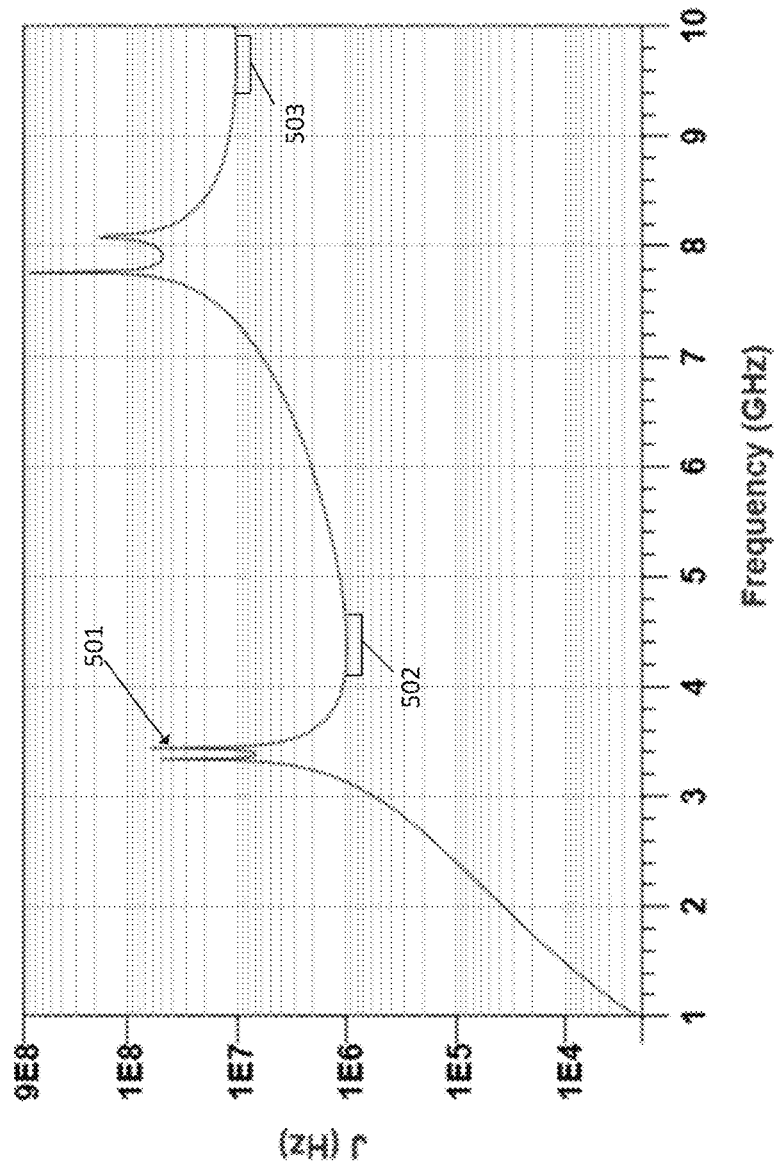
FIG. 5 illustrates a graph showing the amount coupling between qubits in a modular quantum device utilizing inductive coupling on the qubit end, in accordance with one or more embodiments described herein.

FIG. 5 illustrates a graph 500 showing the amount coupling between qubits in a modular quantum device utilizing inductive coupling on the qubit end, in accordance with one or more embodiments described herein.

The x-axis of graph 500 represents the frequency of qubits measured in GHz. The y-axis of graph 500 represents the strength of coupling between two qubits, referred to as an amount of J, measured in Hz. Line 501 represents the relationship between qubit frequency and amount of coupling in a modular qubit device utilizing inductive coupling on the qubit end, such as that described above in relation to FIG. 4. As shown, line 501 has two quasi flat regions 502 and 503 wherein qubit frequency can change with minimal impact on the amount of coupling.

Figure 6A:
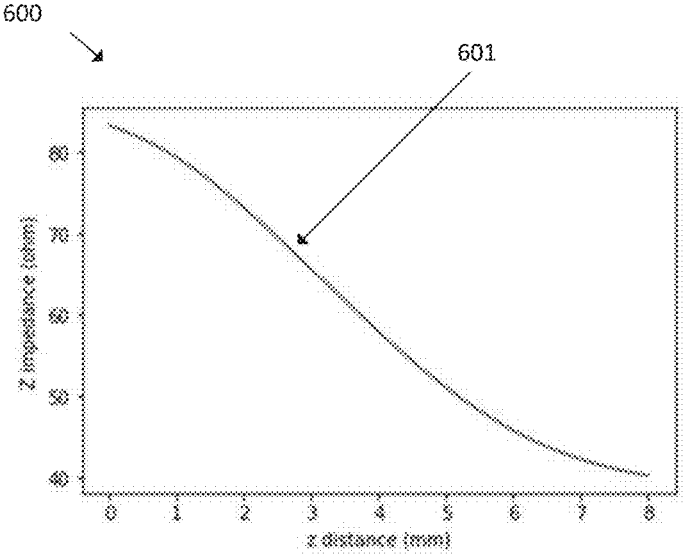
FIG. 6A illustrates a graph showing the relationship between impedance of a resonator and the length of a transmission line, in accordance with one or more embodiments described herein.

FIG. 6A illustrates a graph 600 showing the relationship between impedance of a resonator and the length of a transmission line, in accordance with one or more embodiments described herein.

The y-axis of graph 600 represents the impedance of a tapered resonator measured in ohms and the x-axis represents the length of the transmission line in the resonator in mm. Accordingly, as shown by line 601, as the length of the tapered transmission line increases, the impedance decreases due to the taper.

Figure 6B:
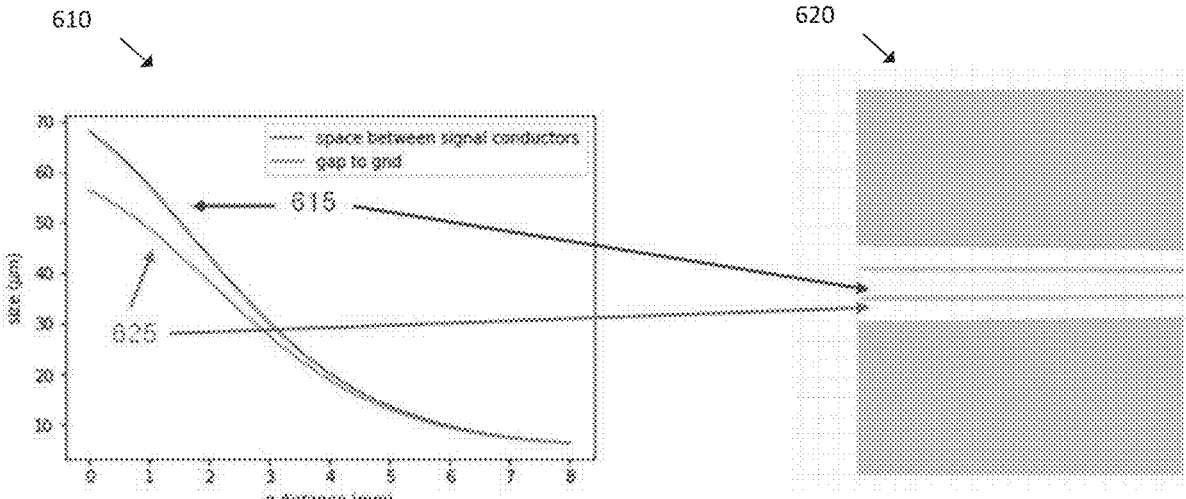
FIG. 6B illustrates a graph of the tapering of a transmission line and the corresponding transmission line, in accordance with one or more embodiments described herein.

FIG. 6B illustrates a graph 610 of the tapering of a transmission line 620, in accordance with one or more embodiments described herein.

The y-axis of graph 610 represents the size of a space between elements in transmission line 620 and the x-axis of graph 610 represents points at a specific length of transmission line 620. Line 615 represents the space between signal conductors in transmission line 620. As shown by line 615, transmission line 620 is tapered as the space between the signal conductors decreases as the length of transmission line 620 increases. Line 625 represents the gap between a signal conductor and a ground plate of transmission line 620. As shown by line 625, transmission line 620 is tapered as the gap between the signal conductors and the ground plates decreases as the length of transmission line 620 increases. Transmission line 620, as shown, can have a strong voltage coupling on the qubit side and a strong current coupling on the coupler side. As shown, transmission line 620 tapers the impedance from high to low.

Figure 7:
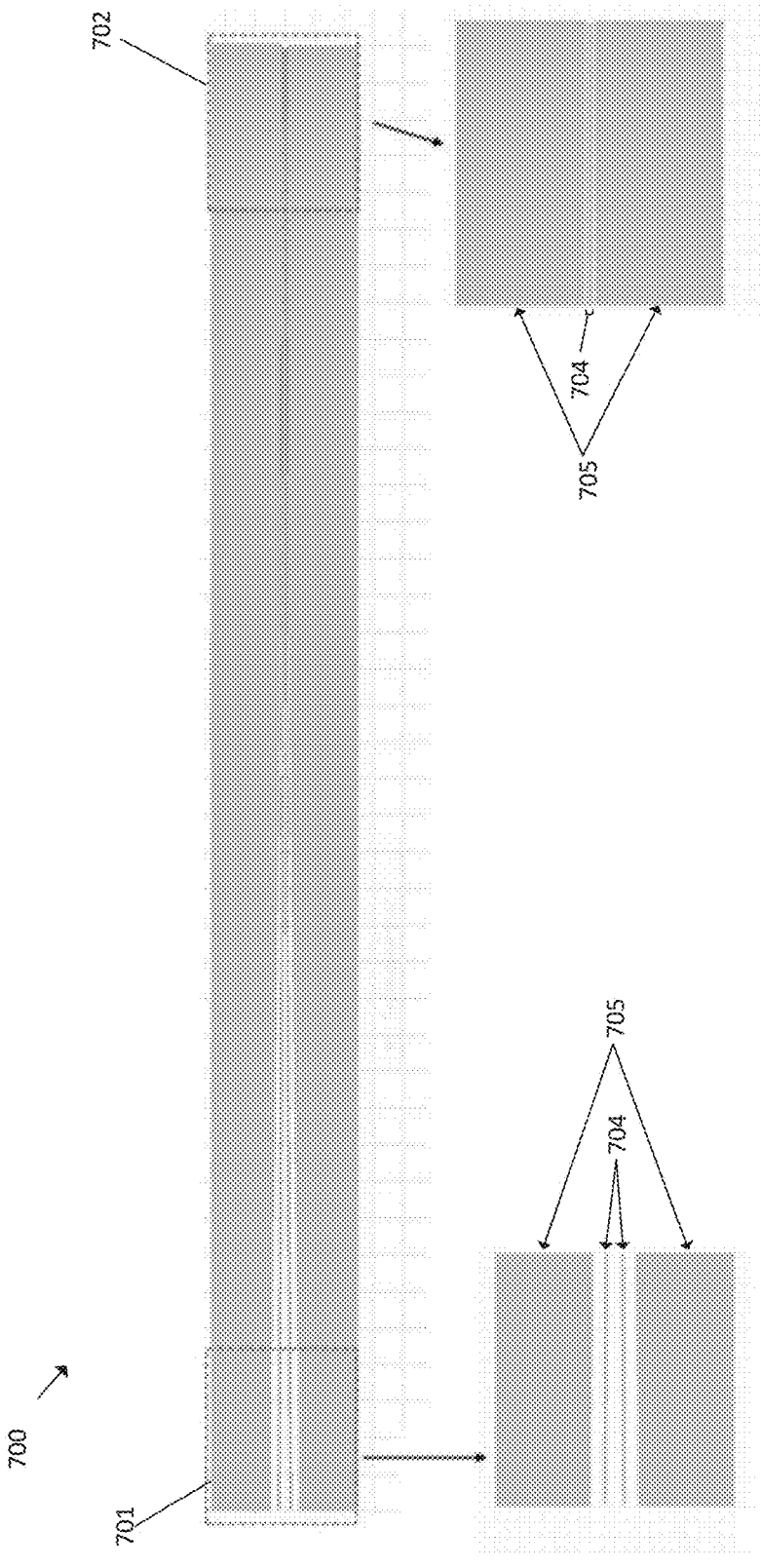
FIG. 7 illustrates an example of a tapered resonator, in accordance with one or more embodiments described herein.

FIG. 7 illustrates an example of a tapered resonator 700 in accordance with one or more embodiments described herein.

As shown, tapered resonator 700 is physically wider at first end 701 than at second end 702. Additionally, as shown, tapered resonator 700 can comprise two trace signals 704 and two ground planes 705. In an embodiment, the two ground planes can be mounted on a common piece of metal (not show) with bump bonds. In an embodiment, the design of tapered resonator 700 can enable a strong voltage coupling at one end (e.g., the end coupled to a qubit) and strong current coupling on the other end (e.g., the end coupled to anther transmission line). In an embodiment, an 8 mm long tapered resonator can be tapered to have a resistance of 85 ohm on the qubit end and a resistance of 30-50 ohms on the coupler end. However, it should be appreciated that any length of resonator, any rate or form of taper, and/or any measure of resistance on either end of the resonator is envisioned. For example, in an embodiment, a Klopfenstein Taper can be utilized.

Figure 8:
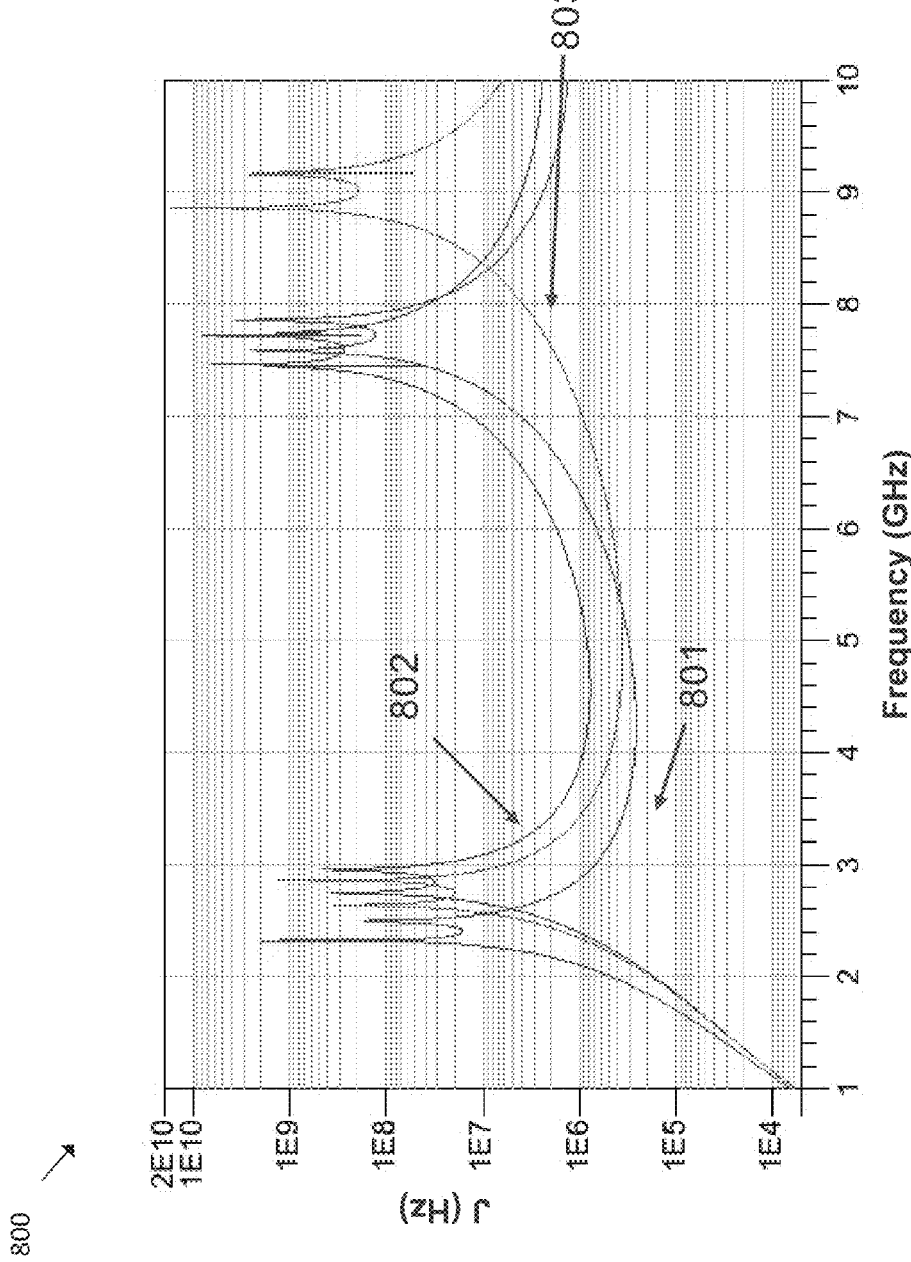
FIG. 8 illustrates a graph showing the impact of changing geometry of a transmission line has on coupling of two qubits, in accordance with one or more embodiments described herein.

FIG. 8 illustrates a graph 800 showing the impact of changing geometry of a transmission line has on coupling of two qubits, in accordance with one or more embodiments described herein.

The x-axis of graph 800 represents the frequency of qubits measured in GHz. The y-axis of graph 800 represents the strength of coupling between two qubits, referred to as an amount of J, measured in Hz. Line 801 represents the amount of J between qubits at various qubit frequencies using a standard transmission line. Line 802 represents the amount of J between qubits at various frequencies, wherein the qubits are connected by a tapered transmission line (e.g., the transmission line is physically wider at one end and narrower at the other end). Line 803 represents the amount of J between qubits at various qubit frequencies using a standard transmission line modified to have the same resonance frequency as the tapered transmission line represented by line 802. Accordingly, while line 803 and 802 may have the same resonance frequencies, the tapered transmission line represented by line 802 still produces a higher amount of coupling than line 803, illustrating that the stronger coupling provided by the tapered transmission line is not due to the differing resonance frequency when compared to standard transmission lines.

Figure 9:
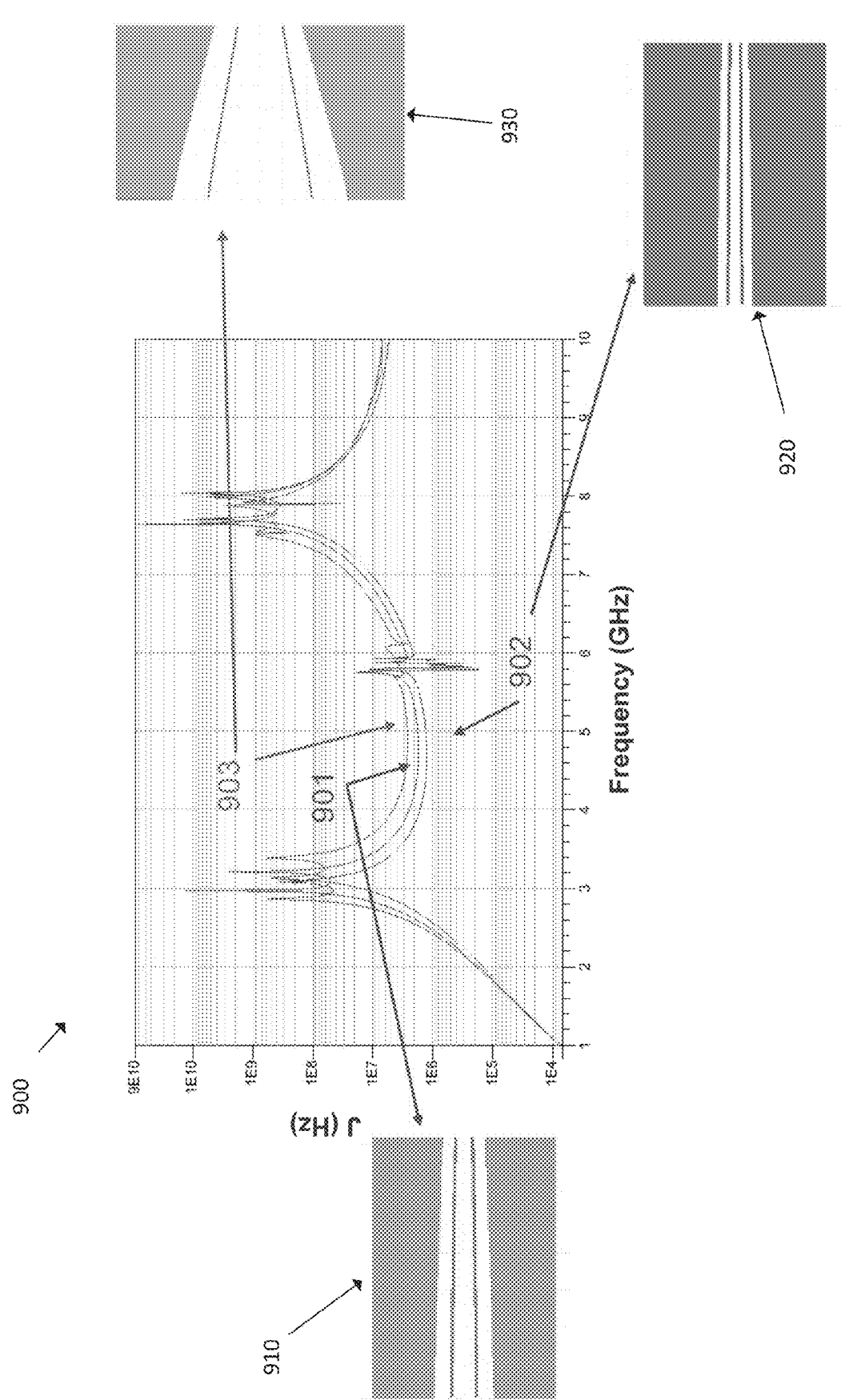
FIG. 9 illustrates a graph showing the impact of changing geometry of a transmission line has on coupling of two qubits, in accordance with one or more embodiments described herein.

FIG. 9 illustrates a graph 900 showing the impact of changing geometry of a transmission line has on coupling of two qubits. The x-axis of graph 900 represents the frequency of qubits measured in GHz. The y-axis of graph 900 represents the strength of coupling between two qubits, referred to as an amount of J, measured in Hz. Lines 901, 902 and 903 represent the amount of J between qubits at various frequencies utilizing resonators with the same impedance at the coupled end and different impedances at the qubit end. Line 901 represents the amount of J between qubits at various frequencies utilizing a resonator 910 tapered to have an impedance of 100 ohms on the qubit end. Line 902 represents the amount of J between qubits at various frequencies utilizing a resonator 920 tapered to have an impedance of 85 ohms on the qubit end. Line 903 represents the amount of J between qubits at various frequencies utilizing a resonator 930 tapered to have an impedance of 150 ohms on the qubit end. This change in impedance at the qubit end can cause resonator frequency to change as well. Additionally, it should be appreciated that the resonators 910, 920 and 930 all exhibit 10-20 percent higher coupling throughout when compared to non-tapered transmission lines. Furthermore, it should be appreciated that use of any taper geometry and/or and any impedance at either end of the resonator is envisioned.

Figure 10:
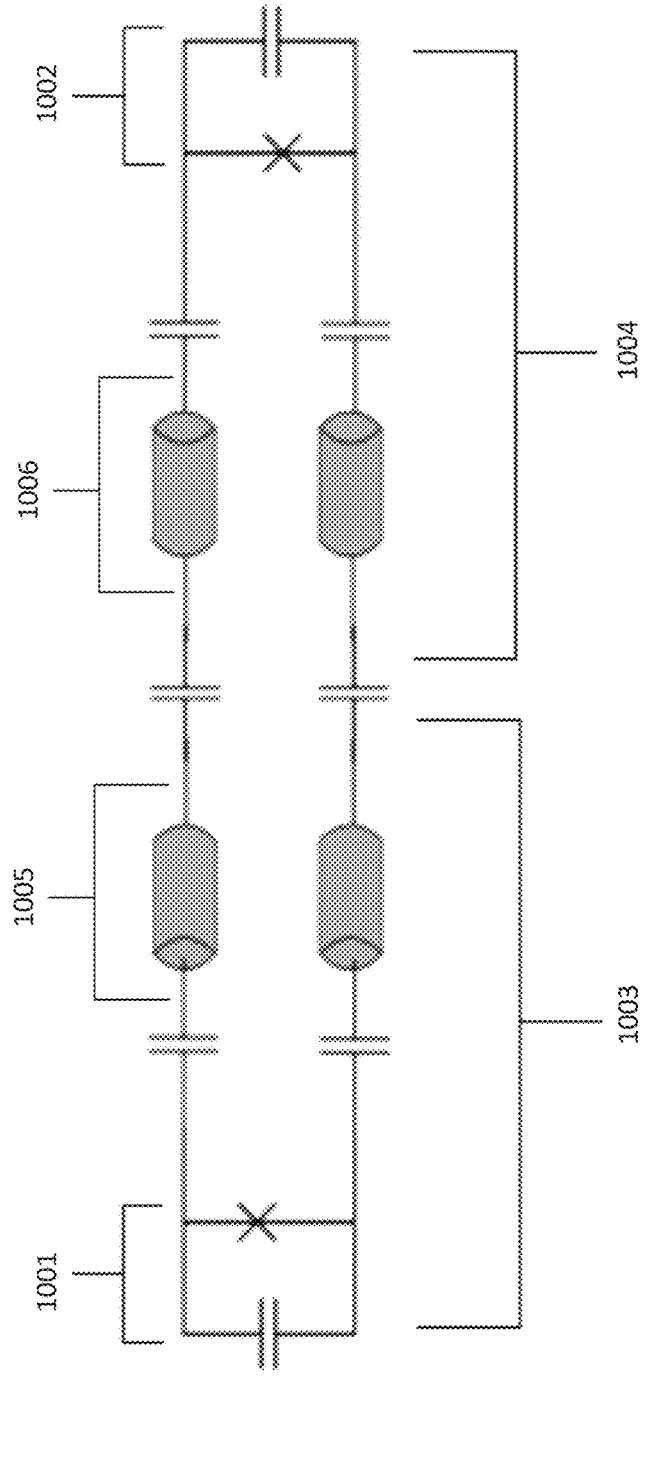
FIG. 10 illustrates a modular quantum device with a capacitively coupled resonator design, in accordance with one or more embodiments described herein.

FIG. 10 illustrates a modular quantum device 1000 with a capacitively coupled resonator design, in accordance with one or more embodiments described herein. Modular quantum device 1000 can comprise a first module 1003 and a second module 1004. First module 1003 can comprise a first qubit 1001 capacitively coupled to a first transmission line resonator 1005. Second module 1004 can comprise a second qubit 1002 capacitively coupled to a second transmission line resonator 1006. In an embodiment, the first transmission line resonator 1005 and the second transmission line resonator 1006 can be capacitively coupled. Similar to modular quantum device 200, described above in FIG. 2, the first module 1003 and the second module 1004 of modular quantum device 1000 can be located on separate chips and/or separate substrates to enable modularity and/or comprise one or more tapered transmission lines.

Figure 11:
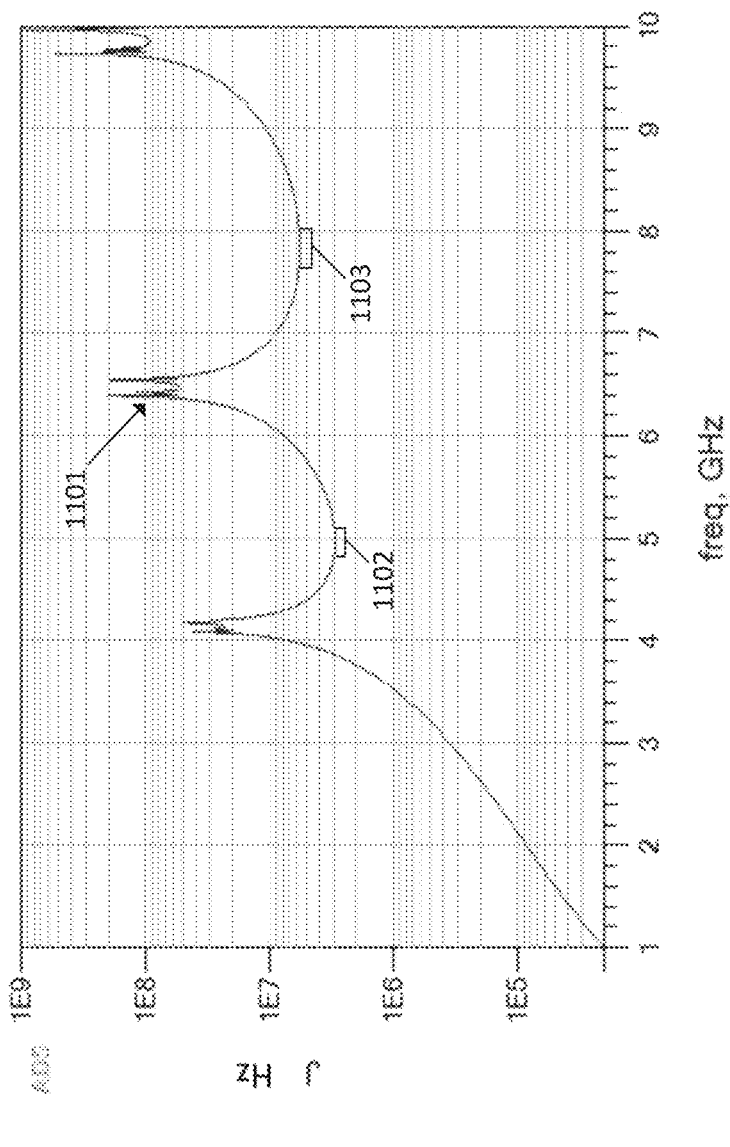
FIG. 11 illustrates a graph showing the amount coupling between qubits in a modular quantum device with a capacitively coupled resonator design, in accordance with one or more embodiments described herein.

FIG. 11 illustrates a graph 1100 showing the amount coupling between qubits in a modular quantum device with a capacitively coupled resonator design, in accordance with one or more embodiments described herein.

The x-axis of graph 1100 represents the frequency of qubits measured in GHz. The y-axis of graph 1100 represents the strength of coupling between two qubits, referred to as an amount of J, measured in Hz. Line 1101 represents the relationship between qubit frequency and amount of coupling in a modular qubit device with a capacitively coupled resonator design, such as that described above in relation to FIG. 10. As shown, line 1101 has two quasi flat regions 1102 and 1103, wherein qubit frequency can change with minimal impact on the amount of coupling.

Figure 12:
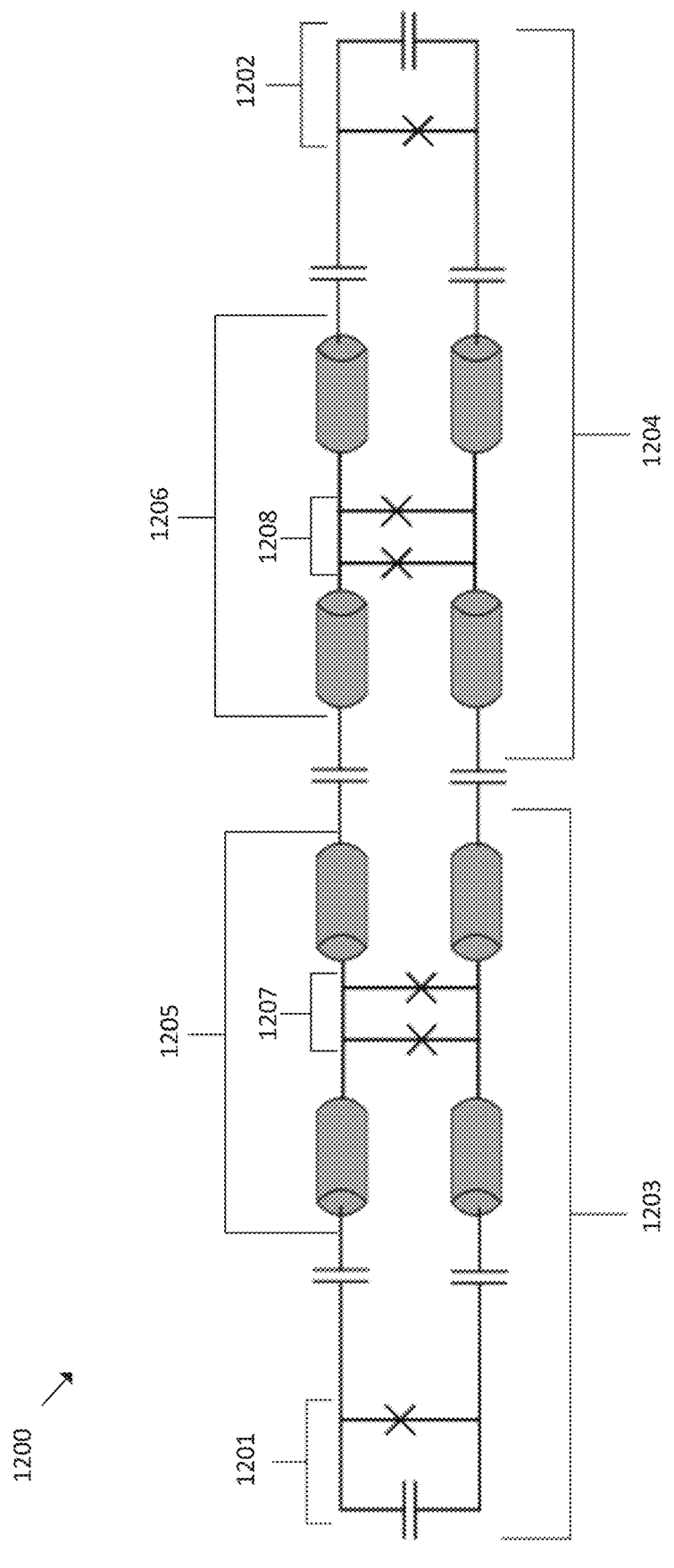
FIG. 12 illustrates a modular quantum device with a capacitively coupled resonator design with tunability, in accordance with one or more embodiments described herein.

FIG. 12 illustrates a modular quantum device 1200 with a capacitively coupled resonator design with tunability, in accordance with one or more embodiments described herein.

Modular quantum device 1200 can comprise a first module 1203 and a second module 1204. First module 1203 can comprise a first qubit 1201 capacitively coupled to a first transmission line resonator 1205. Second module 1204 can comprise a second qubit 1202 capacitively coupled to a second transmission line resonator 1206. In an embodiment, the first transmission line resonator 1205 and the second transmission line resonator 1206 can be capacitively coupled. First transmission line resonator 1205 can further comprise a first DC squid 1207 and second transmission line resonator 106 can comprise a second DC squid 1208. By including the first DC squid 1207 and the second DC squid 1208, the capacitive coupling in modular quantum device 1200 instead acts as inductive coupling. Furthermore, the inclusion of the first DC squid 1207 and the second DC squid 1208 enable flux tuning of modular quantum device 1200. For example, by changing the flux through first DC squid 1207 and the second DC squid 1208, the inductance of first DC squid 1207 and the second DC squid 1208 can be adjusted, thereby enabling the coupling of the first qubit 1201 and the second qubit 1202 to be turned on and off and/or increased and decreased. Similar to modular quantum device 200, described above in FIG. 2, the first module 1203 and the second module 1204 of modular quantum device 1200 can be located on separate chips and/or separate substrates to enable modularity and/or comprise one or more tapered transmission lines.

Figure 13:
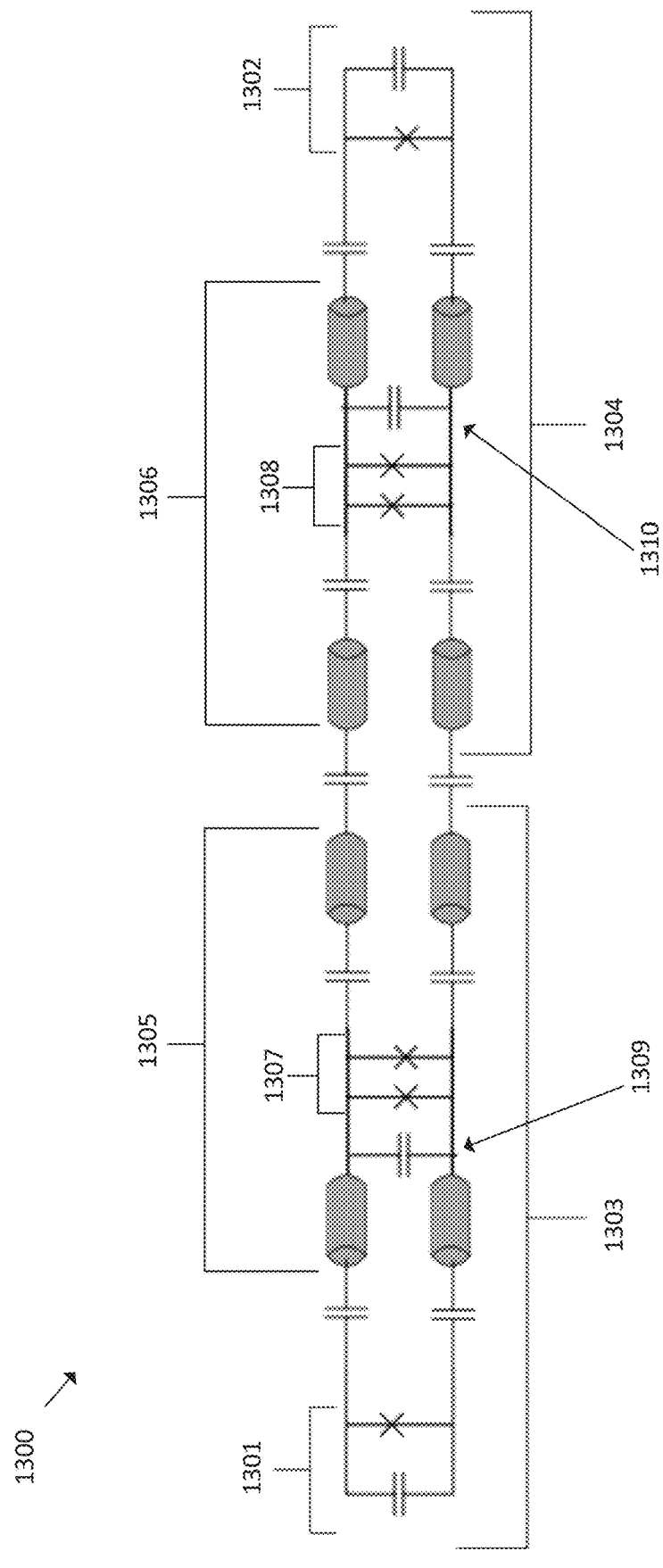
FIG. 13 illustrates a modular quantum device with a capacitively coupled resonator design with tunability, in accordance with one or more embodiments described herein.

FIG. 13 illustrates a modular quantum device 1300 with a capacitively coupled resonator design with tunability, in accordance with one or more embodiments described herein. Modular quantum device 1300 can comprise a first module 1303 and a second module 1304. First module 1303 can comprise a first qubit 1301 capacitively coupled to a first transmission line resonator 1305. Second module 1304 can comprise a second qubit 1302 capacitively coupled to a second transmission line resonator 1306. In an embodiment, the first transmission line resonator 1305 and the second transmission line resonator 1306 can be capacitively coupled. First transmission line resonator 1305 can further comprise a first DC squid 1307 and second transmission line resonator 1306 can comprise a second DC squid 1308. By including the first DC squid 1307 and the second DC squid 1308, the capacitive coupling in modular quantum device 1300 instead acts as inductive coupling. Furthermore, the inclusion of the first DC squid 1307 and the second DC squid 1308 enable flux tuning of modular quantum device 1300. For example, by changing the flux through first DC squid 1307 and the second DC squid 1308, the inductance of first DC squid 1307 and the second DC squid 1308 can be adjusted, thereby enabling the coupling of the first qubit 1301 and the second qubit 1302 to be turned on and off and/or increased and decreased. In an embodiment, the first transmission line resonator 1305 can comprise a first capacitor 1309 and the second transmission line resonator 1306 can comprise a second capacitor 1310. Similar to modular quantum device 200, described above in FIG. 2, the first module 1303 and the second module 1304 of modular quantum device 1300 can be located on separate chips and/or separate substrates to enable modularity and/or comprise one or more tapered transmission lines.

Figures 14A, 14B:
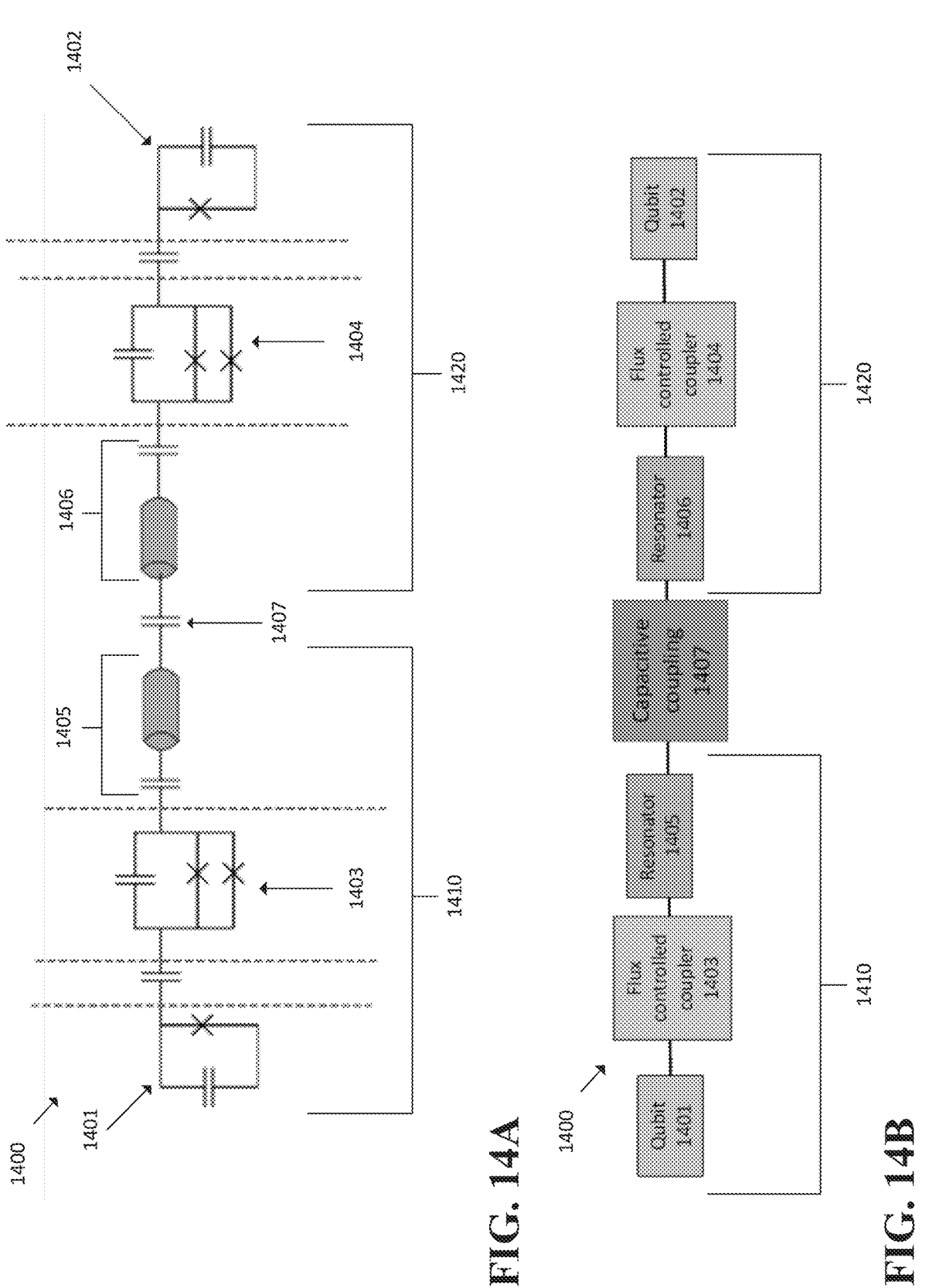
FIGS. 14A and 14B illustrate two diagrams of a modular quantum device with a flux-controlled bus with capacitive coupling, in accordance with one or more embodiments described herein.

FIGS. 14A and 14B illustrate two diagrams of a modular quantum device 1400 with a flux-controlled bus with capacitive coupling, in accordance with one or more embodiments described herein. Modular quantum device 1400 can comprise a first module 1410 and a second module 1420. The first module 1410 can comprise a first qubit 1401, a first flux controlled coupler 1403 and a first resonator 1405. The second module 1420 can comprise a second qubit 1402, a second flux controlled coupler 1404 and a second resonator 1406. The first module 1410 and the second module 1420 can be capacitively coupled 1407 together. By changing the frequency of the first flux controlled coupler 1403 and the second flux controlled coupler 1404, the coupling between the first qubit 1401 and the second qubit 1402 can be increased or decreased accordingly. Similar to modular quantum device 200 described above in FIG. 2, the first module 1410 and the second module 1420 of modular quantum device 1400 can be located on separate chips and/or separate substrates to enable modularity and/or comprise one or more tapered transmission lines.

Figure 15:
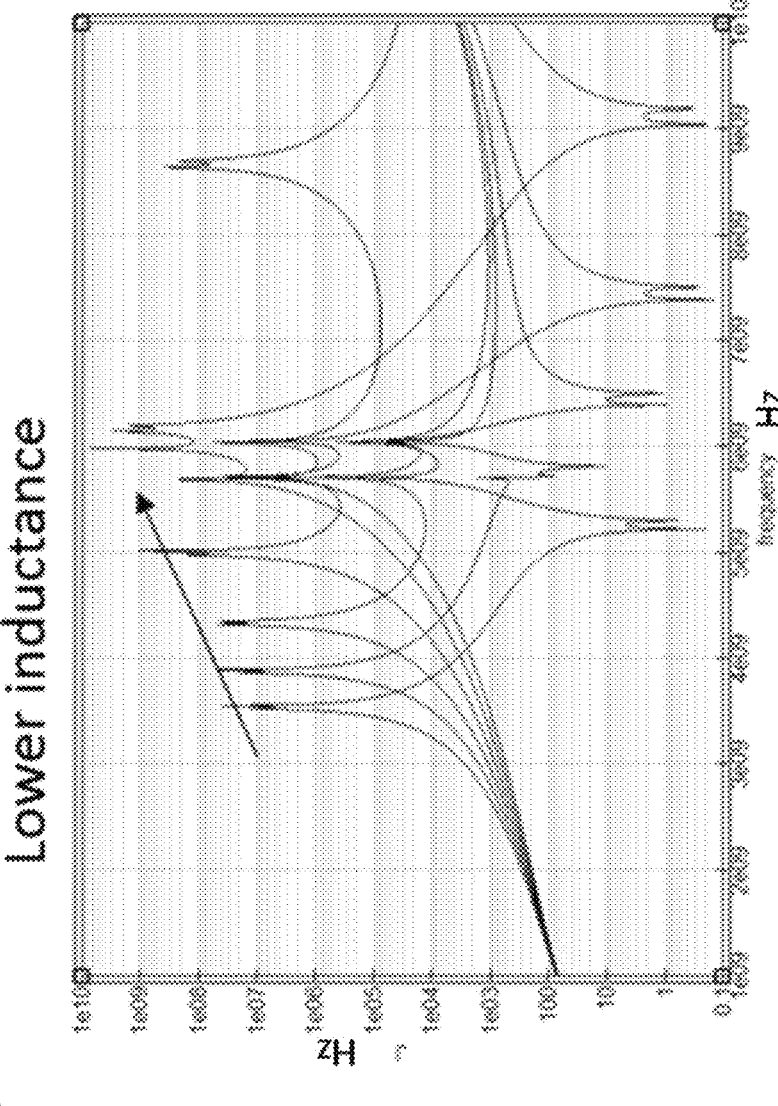
FIG. 15 illustrates a graph showing the tunability of a modular quantum device with capacitive coupling, in accordance with one or more embodiments described herein.

FIG. 15 illustrates a graph 1500 showing the tunability of a modular quantum device with capacitive coupling, in accordance with one or more embodiments described herein.

The x-axis of graph 1500 represents the frequency of qubits measured in GHz. The y-axis of graph 1500 represents the strength of coupling between two qubits, referred to as an amount of J, measured in Hz. As shown, the various lines of graph 1500 represent the strength of coupling between two qubits at different tunings of flux controlled couplers. For example, as described above in reference to FIGS. 14A and 14B, different magnetic fields can be applied to flux controlled couplers 1403 and 1404 to change the amount of coupling between qubits 1401 and 1402. Accordingly, the lines of graph 1500 illustrate the different amounts of coupling between qubits 1401 and 1402 based on the magnetic fields applied to flux controlled couplers 1403 and 1404.

Figures 16A, 16B:
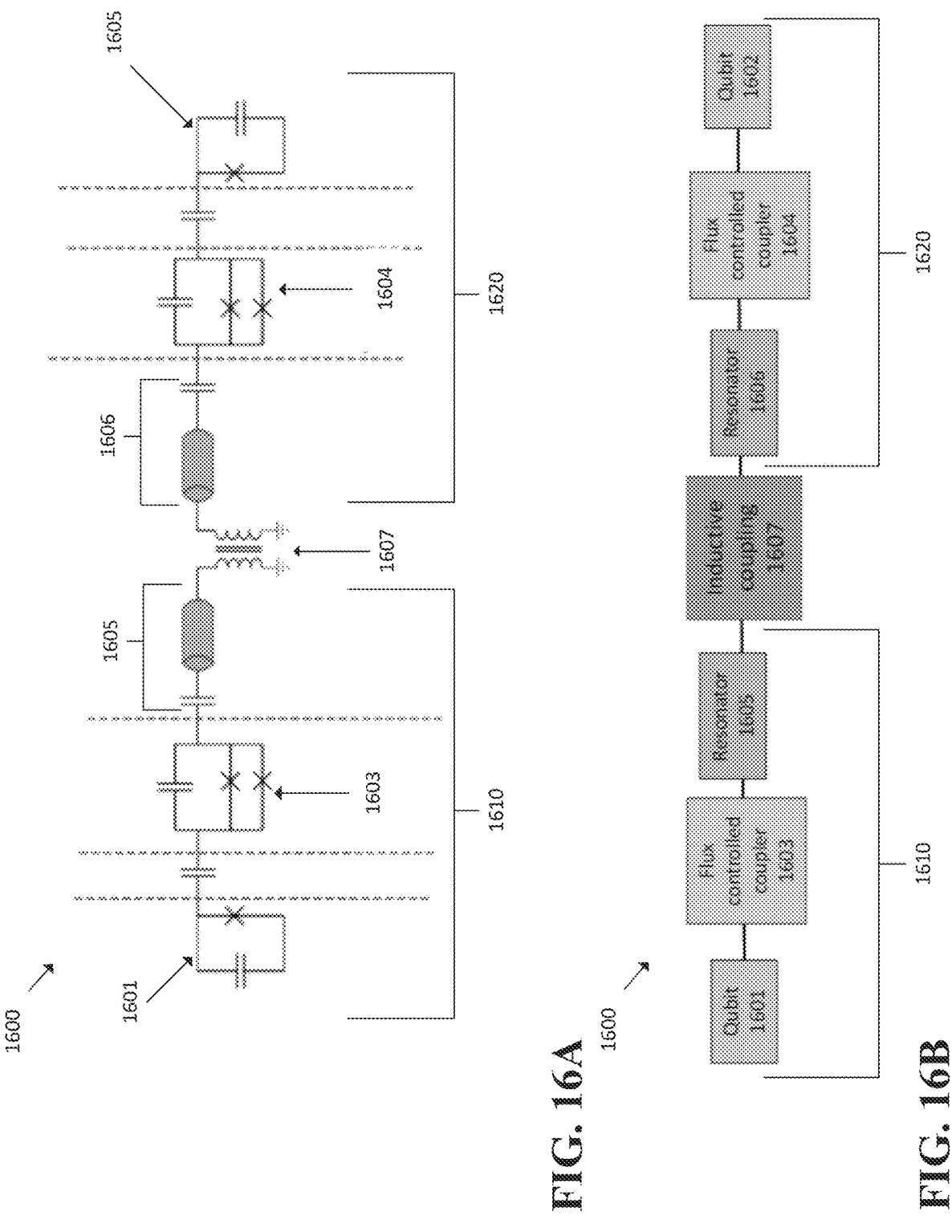
FIGS. 16A and 16B illustrate two diagrams of a modular quantum device with a flux-controlled bus with capacitive coupling, in accordance with one or more embodiments described herein.

FIGS. 16A and 16B illustrate two diagrams of a modular quantum device 1600 with a flux-controlled bus with inductive coupling, in accordance with one or more embodiments described herein. Modular quantum device 1600 can comprise a first module 1610 and a second module 1620. The first module 1610 can comprise a first qubit 1601, a first flux controlled coupler 1603 and a first resonator 1605. The second module 1620 can comprise a second qubit 1602, a second flux controlled coupler 1604 and a second resonator 1606. The first module 1610 and the second module 1620 can be inductively coupled 1607 together. By changing the frequency of the first flux controlled coupler 1603 and/or the second flux controlled coupler 1604, the coupling between the first qubit 1601 and the second qubit 1602 can be increased or decreased accordingly. Similar to modular quantum device 200 described above in FIG. 2, the first module 1610 and the second module 1620 of modular quantum device 1600 can be located on separate chips and/or separate substrates to enable modularity and/or comprise one or more tapered transmission lines.

Figure 17:
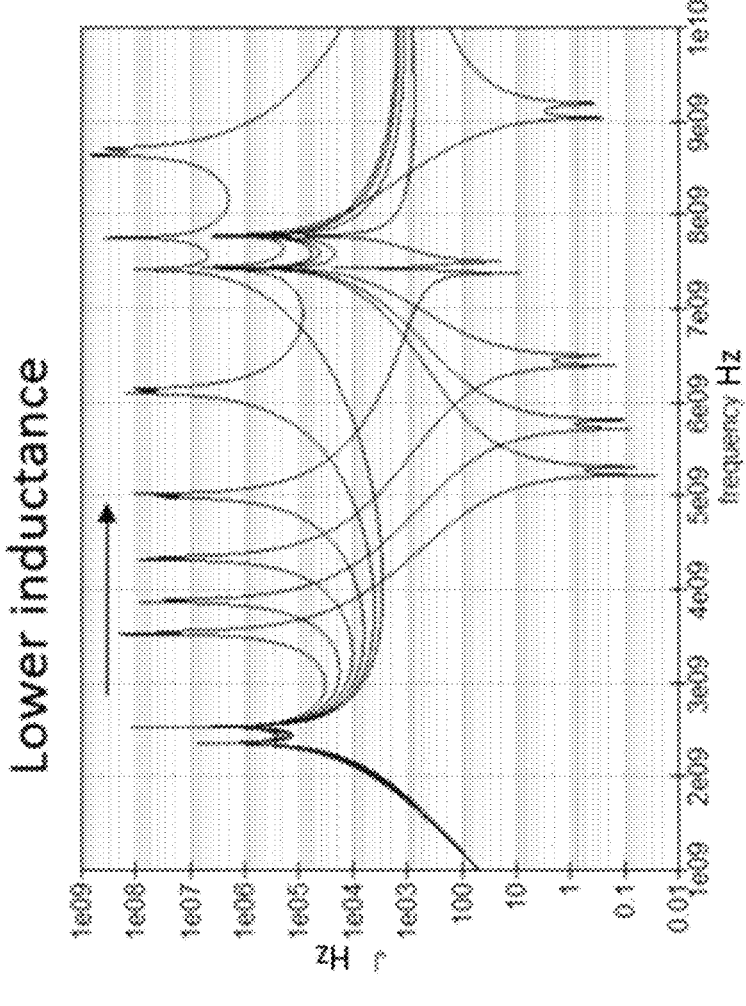
FIG. 17 illustrates graph showing the tunability of a modular quantum device with capacitive coupling, in accordance with one or more embodiments described herein.

FIG. 17 illustrates graph 1700 showing the tunability of a modular quantum device with capacitive coupling, in accordance with one or more embodiments described herein.

The x-axis of graph 1700 represents the frequency of qubits measured in GHz. The y-axis of graph 1700 represents the strength of coupling between two qubits, referred to as an amount of J, measured in Hz. As shown, the various lines of graph 1700 represent the strength of coupling between two qubits at different tunings of flux controlled couplers. For example, as described above in reference to FIGS. 16A and 16B, different magnetic fields can be applied to flux controlled couplers 1603 and 1604 to change the amount of coupling between qubits 1601 and 1602. Accordingly, the lines of graph 1600 illustrate the different amounts of coupling between qubits 1601 and 1602 based on the magnetic fields applied to flux controlled couplers 1603 and 1604.

In an embodiment, a method can comprise performing, by a modular quantum device, a quantum gate operation, wherein the modular quantum device comprises, a first module comprising a first qubit coupled to a first transmission line resonator comprising a first flux controlled coupler, and a second module comprising a second qubit coupled to a second transmission line resonator comprising a second flux controlled coupler, wherein the first module is embodied in a first chip and wherein the second module is embodied in a second chip, and wherein the first transmission line resonator is coupled to the second transmission line resonator.

In an embodiment, the method can further comprise adjusting flux applied to the first flux controller coupler and/or adjusting flux applied to the second flux controlled coupler based on the quantum gate operation.

An advantage of such devices, systems and/or methods described herein is that they enable modular quantum devices which can enable greater scalability of quantum systems and/or easier repair and lower repair costs of quantum systems. For example, by placing a first module and a second module on separate chips and/or separate substrates, modularity can be achieved as individual modules can be produced and replaced as called for, instead of producing whole quantum systems and replacing whole quantum systems. Another advantage of such devices, systems and/or methods described herein is that tapered transmission lines can enabled improved performance of modular quantum devices. For example, by tapering transmission lines to have high impedance at one end and low impedance at a second end, higher coupling can be achieved between qubits located on separate modules and reflections can be decreased between modules, thereby improving performance of a modular quantum device.

What is claimed is:

1. A device comprising:
a first quantum processor comprising a first set of one or more qubits coupled to a first transmission line resonator; and
a second quantum processor comprising a second set of one or more qubits coupled to a second transmission line resonator, wherein the first quantum processor is embodied in a first chip and wherein the second quantum processor is embodied in a second chip, and wherein the first transmission line resonator is coupled to the second transmission line resonator.

2. The device of claim 1, wherein the first chip is located on a first substrate and the second chip is located on a second substrate.

3. The device of claim 1, wherein the first transmission line resonator comprises a taper configured to provide a first impedance at the first quantum processor, and wherein the second transmission line resonator comprises a second taper configured to provide a second impedance at the second quantum processor.

4. The device of claim 3, wherein the taper is configured to provide a third impedance at a portion of the first transmission line resonator coupled to the second transmission line resonator, and wherein the second taper is configured to provide a fourth impedance at a portion of the second transmission line resonator coupled to the first transmission line resonator.

5. The device of claim 1, wherein the first quantum processor is capacitively coupled to the first transmission line resonator and wherein the second quantum processor is capacitively coupled to the second transmission line resonator.

6. The device of claim 1, wherein the first quantum processor is inductively coupled to the first transmission line resonator and wherein the second quantum processor is inductively coupled to the second transmission line resonator.

7. The device of claim 1, wherein the first transmission line resonator is capacitively coupled to the second transmission line resonator.

8. The device of claim 1, wherein the first transmission line resonator is inductively coupled to the second transmission line resonator.

9. A device comprising:
a first module comprising a first qubit coupled to a first transmission line resonator comprising a first flux controlled coupler; and
a second module comprising a second qubit coupled to a second transmission line resonator comprising a second flux controlled coupler, wherein the first module is embodied in a first chip and wherein the second module is embodied in a second chip, and wherein the first transmission line resonator is coupled to the second transmission line resonator.

10. The device of claim 9, wherein the first flux controlled coupler and the second flux controlled coupler enable adjustable coupling between the first qubit and the second qubit.

11. The device of claim 9, wherein the first transmission line resonator and the second transmission line resonator are capacitively coupled.

12. The device of claim 9, wherein the first transmission line resonator and the second transmission line resonator are inductively coupled.

13. The device of claim 9, wherein the first chip is located on a first substrate and the second chip is located on a second substrate.

* * * * *